United States Patent [19]

Imhof et al.

[11] Patent Number: 5,591,053
[45] Date of Patent: Jan. 7, 1997

[54] CURRENT TAPPING VANE AND METHOD FOR PRODUCING SAME

[75] Inventors: Otwin Imhof, Nuertingen; Holger Kistrup, Esslingen; Wilhelm Kitzhoefer, Brilon, all of Germany

[73] Assignees: Deutsche Automobilgesellschaft mbH; Daug-Hoppecke Gesellschaft fuer Batteiesysteme mbH, both of Germany

[21] Appl. No.: 550,519

[22] Filed: Oct. 30, 1995

Related U.S. Application Data

[63] Continuation of Ser. No. 159,868, Dec. 1, 1993.

[30]  Foreign Application Priority Data

Dec. 1, 1992 [DE] Germany ............ 42 40 338.3

[51] Int. Cl.⁶ ...................................................... H01R 4/02
[52] U.S. Cl. ....................................................... 439/874
[58] Field of Search ............................ 219/93; 429/211; 439/874, 879, 434; 29/860

[56]  References Cited

U.S. PATENT DOCUMENTS 5,246,797 9/1993 Imhof et al. ............................ 429/211
5,264,306 11/1993 Walker et al. ....................... 219/93 X

FOREIGN PATENT DOCUMENTS 0034285 2/1990 Japan ............................... 219/93

OTHER PUBLICATIONS

J. Arata et al., "Modern Welding Techniques", Sampo Publishing, Corp., 1960, pp. 116–20.

*Primary Examiner*—Neil Abrams
*Assistant Examiner*—Barry Matthew L. Standig
*Attorney, Agent, or Firm*—Evenson, McKeown, Edwards & Lenahan P.L.L.C.

[57]  ABSTRACT

A battery current tapping vane is welded to a connecting strap at its one end region. The vane has weld burls and is bent over transversely to the flat side of the remaining current tapping vane. To improve the welding process and to reduce waste, the weld burls are produced in full bodied version at least in the bent end region which is provided on both sides with recesses or reduced thickness portions. The depth of the recesses or portion is greater than the amount of settlement in the course of welding on. The weld burls are alternatively formed by material archings with sides projecting transversely from the bent end region of the current tapping vane and merge into the current tapping vane, with a radius of curvature corresponding to no greater than twice the wall thickness of the current tapping vane.

11 Claims, 4 Drawing Sheets

CURRENT TAPPING VANE AND METHOD FOR PRODUCING SAME

This application is a continuation of application Ser. No. 08/159,868, filed on Dec. 1, 1993.

BACKGROUND AND SUMMARY OF THE INVENTION

The present invention relates to a current tapping vane of a battery for end-side electrical resistance welding to a connecting strap in which that end region of the current tapping vane which is to be welded is bent transversely to the current tapping vane and is provided with weld burls at a bent end region, and to a process for making such a current tapping vane in which a sheet metal strip is inserted into a punching tool in a defined position and the current tapping vane is punched out from the sheet metal strip in accordance with its extended outline form and is provided, at the end region, with the weld burls for electrical resistance welding to a connecting strap, and the intended end region is bent over transversely to the flat side of the remaining current tapping vane.

A conventional current tapping vane can be either a thin current tapping vane, the thickness of which amounts to between 0.2 mm and 0.7 mm, and also thicker current tapping vanes with a thickness between 0.5 mm and 2.0 mm. Such a current tapping vane for a battery is formed, in general, of a sheet metal strip, at the one, electrode-side end region of which an electrode structure of fibrous construction is disposed. The production of these electrode plates preferably takes place by a resistance welding of the electrode structure to the current tapping vane. The electrode plates are stacked on one another with the intercalation of separators and, depending upon the polarity, electrically conductively connected to one another. The electrical connection of the electrode plates of the same polarity takes place in this case in that the current tapping vanes are welded, in particular by a resistance welding, at their other connecting strap-side end region to a connecting strap.

In order to simplify the welding, the connecting strap-side end regions of the current tapping vanes are bent transversely to the flat side of the other current tapping vane, preferably by an angle of approximately 90°. Since the thickness of the material of the connecting strap and that of the current tapping vane differ greatly from one another (in general, the thickness of the material of the connecting strap is five times the thickness of the material of the current tapping vane) the connecting strapside, bent end region is provided with weld burls. In spite of these weld burls, it is repeatedly the case that incorrect or bad welding occurs.

An object of the present invention is to improve the known current tapping vane by improving the connection in the course of welding to the connecting strap and reducing the waste caused by welding defects in the course of welding of the current tapping vane to the connecting strap.

According to the present invention, the foregoing object has been achieved by providing that the weld burls are solid walls, and the current tapping vane is provided, at least in the bent end region, on both sides beside the weld burls, with one of interstices and reduced thickness portions, the depth of which is sized to be greater than a predetermined amount of settlement occurring during welding on, or the weld burls are material archings having sides which project transversely from the bent end region of the current tapping vane and merge with a radius of curvature corresponding to no greater than twice a wall thickness of the current tapping vane into the current tapping vane.

With respect to the novel process comprising the present invention, the foregoing object has been achieved by providing that after the bending over of the end region the weld burls are fitted into the latter by penetrating the current tapping vane or prior to the bending over of the end region the weld burls are fitted into the latter, in that a row of interstices are punched free from the lateral margin of the current tapping vane and spaced tongues are exposed.

According to the invention with respect to the two embodiments of the weld burls, melting takes place, during resistance welding, of the solid parts of the bent end region which are disposed between the material reductions or recesses, or the sides of the material archings which now do not spring back, to a large extent at the edge sides with the formation of good weld spots. In both embodiments, the quality of tile weld spots between the current tapping vane and the connecting strap is substantially improved.

BRIEF DESCRIPTION OF THE DRAWINGS

These and further objects, features and advantages of the present invention will become more readily apparent from the following detailed description when taken in conjunction with the accompanying drawings wherein.

DETAILED DESCRIPTION OF THE DRAWINGS

Figure 1:
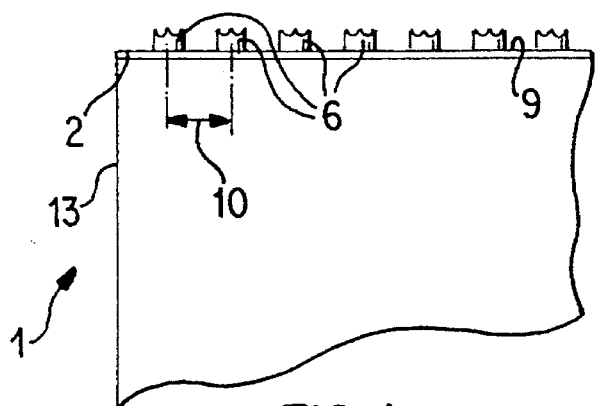
FIG. 1 is a plan view onto the flat side of a thin current tapping vane with tab rims which are disposed in its upper, bent end region to form a row of tabs and which are formed of a plurality of sheet metal tabs.
Figure 2:
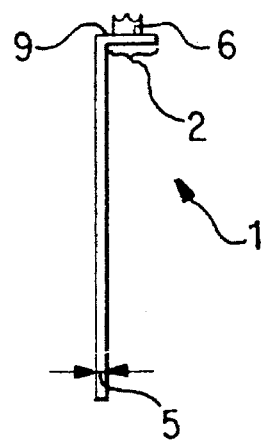
FIG. 2 is an elevational view of the left-hand narrow or width side of the current tapping vane of FIG. 1.
Figure 3:
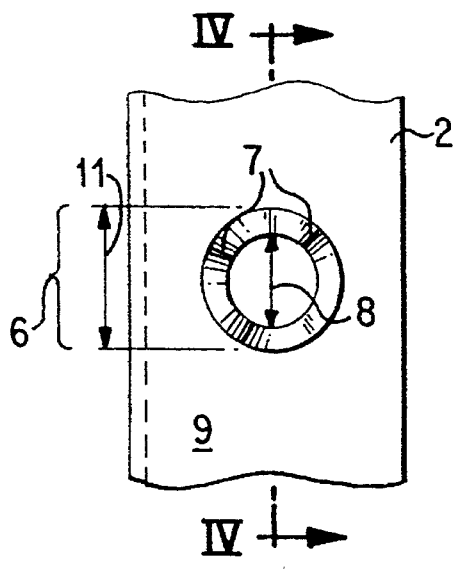
FIG. 3 is a plan view onto a tab rim seen from a direction of the later connecting strap.
Figure 4:
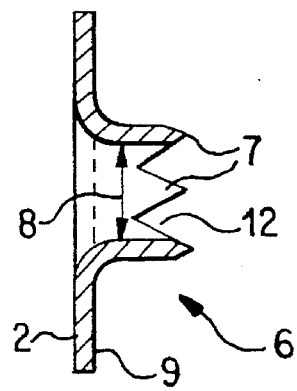
FIG. 4 is a sectional view through a tab rim along the line IV—IV of FIG. 3.

FIGS. 1 and 2 show a current tapping vane designated generally by numeral 1 of a battery which is provided for the end-side electrical resistance welding to a connecting strap 14. This arrangement is particularly suitable for thin current tapping vanes with a wall thickness between 0.1 mm and 0.8 mm. The current tapping vane 1 has an end region which is to be welded and which is bent over transversely to the current tapping vane. The bent end region 2 is provided with weld burls which are formed by perforations of round basic shape and the borders of which stand out transversely from the bent end region 2 as seen in FIGS. 3 and 4. In a favorable manner, the perforations exhibit an internal diameter 8 of between 0.5 mm and 2.5 mm. The respective borders are subdivided into individual sheet metal tabs 7 which are combined to form a tab rim 6. The longitudinal extent of the sheet metal tabs 7 over the bent end region 2 amounts to approximately 0.4 mm to 2.7 mm.

The sheet metal tabs 7 standing out transversely from the flat side 9 of the bent end region 2 of the current tapping vane 1 merge by a radius of curvature corresponding at most to twice the wall thickness 5 of the current tapping vane 1 into the current tapping vane 1. The sheet metal tabs 7 of the tab rims 6 form an angle to the flat side 9 of the bent end region 2, which angle is between 75° and 105°. The best welding results are obtained with an angle of approximately 90°. The sheet metal tabs 7 distributed irregularly over the periphery of the tab rim 6 exhibit a differing longitudinal extent over the bent end region 2 and gaps 12 of differing width are disposed between adjacent sheet metal tabs 7. As a result of the sheet metal tabs 7 being stamped out from the material of the bent end region 2, the tips of the sheet metal tabs 7 are in most cases formed with sharp edges. This is advantageous because, in the course of the subsequent electrical resistance welding of the current tapping vane 1 onto a connecting strap 14, a high current density is present at the tips (see FIGS. 5 to 7).

Along the bent end region 2, a plurality of individual tab rims 6 are disposed in a row and have a mutual spacing 10 which amounts to 1.5 times to 3 times their external diameter 11. The outer margin of the outer tab rims 6 is disposed at a distance of at least 1.0 mm from the corresponding lateral margin 13 of the bent end region 2 seen in FIG. 1. Depending upon the particular application, it will be advantageous if the internal diameter 8 of the tab rims 6 increases towards the ends of a row and if the spacing of the last tab rim 6 from the adjoining lateral margin 13 of the bent end region 2 is greater than one half of the mutual spacing 10 between the individual tab rims 6 of a row.

A novel process for the production of a current tapping vane 1 shown in FIGS. 1 to 4 is now described. A sheen metal strip is inserted into a stamping tool in a defined position, and the current tapping vane 1 is stamped out from this sheet metal strip in accordance with its extended outline form. Subsequently, the end region 2 intended for electrical resistance welding to a connecting strap 14 is bent over through approximately 90° transversely to the flat side of the remaining current tapping vane 1. After the bending over, penetration takes place along the bent end region 2 using a sharp, round punch, preferably over a perforated metal sheet. Consequently, the toothed rims 6 are punched out from the material of the bent end region 2. In the course of the punching out of the bent end region 2 of the current tapping vane 1, the material of the perforations tears into individual sheet metal tabs 7 whose tips are sharp-edged in most cases.

In the subsequent electrical resistance welding to the connecting strap 14, in the first instance the tips of the sheet metal tabs 2 impact directly onto the connecting strap 14. In this embodiment of the current tapping vane 1, all tab rims 6, and thus also the flat side 9 of the bent end region, can be welded at once to a single copper electrode. When the welding electrodes are run together or when the upper welding electrode is brought down, the sheet metal tabs 7 of the tab rims 6 penetrate into the material of the connecting strap 14. Current concentrations occur at these positions, during welding, and this causes a high degree of heat development, as a consequence of which, good weld spots are formed there. The temperature is increased so substantially that the basic materials melt and the sheet metal tabs 7 can be easily deformed and, in some cases, penetrate even more deeply into the material of the connecting strap 14, which material is molten at that position.

Figure 5:
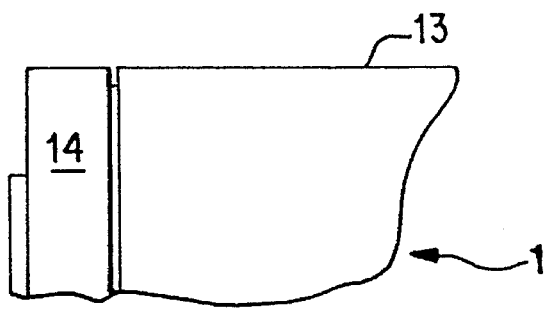
FIG. 5 is a partial view of a connecting strap with two welded-on thin current tapping vanes perpendicular to their flat side.
Figure 7:
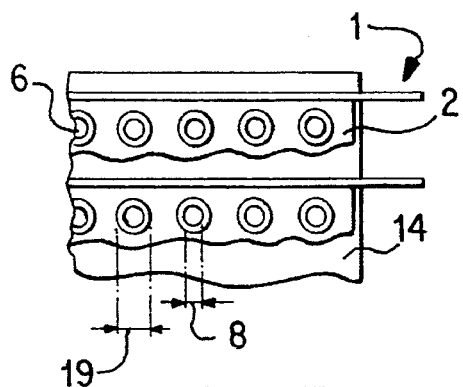
FIG. 7 is an elevational view of the arrangement according to FIG. 5 onto the right-hand narrow sides representing the width of the current tapping vanes.
Figure 6:
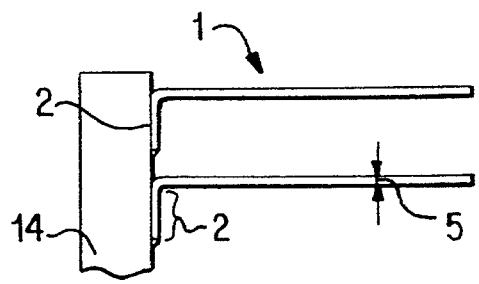
FIG. 6 is an elevational view of the arrangement of FIG. 5 onto the upper narrow sides representing the length of the current tapping vanes.
Figure 8:
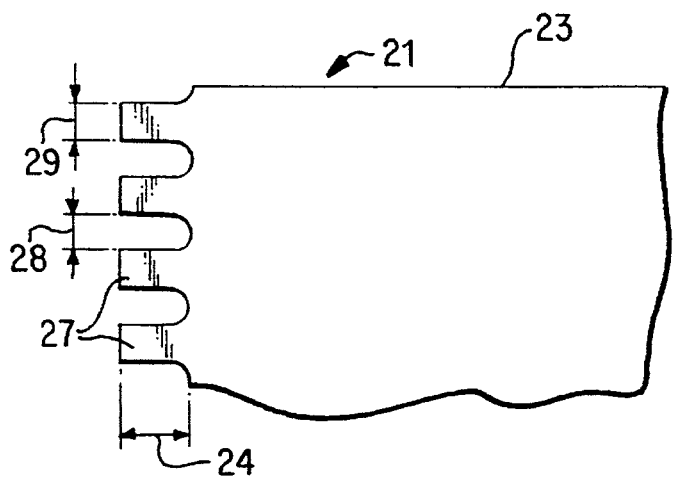
FIG. 8 is a plan view onto the flat side of a thick and deformed current tapping vane in the upper region with a series of teeth disposed thereon.
Figure 9:
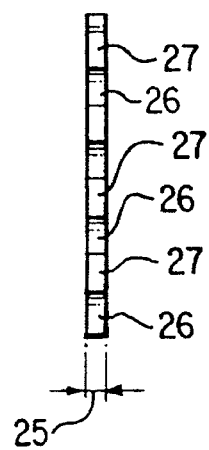
FIG. 9 is an elevational view of the left-hand narrow with side of the current tapping vane of FIG. 8.

After welding, the entire flat side 9 of the bent end region 2 rests against the connecting strap 14, and the thickness of the material of the current tapping vane 1 has decreased in the bent end region 2 and abuts in the centers of the tab rims 6 as best seen in FIGS. 5 to 7. The quality of the welding is based in this situation mainly on the shaping stiffness of the sheet metal tabs 7. In destructive testing on the material, it has become evident that this weld connection is releasable only by destruction.

Figure 10:
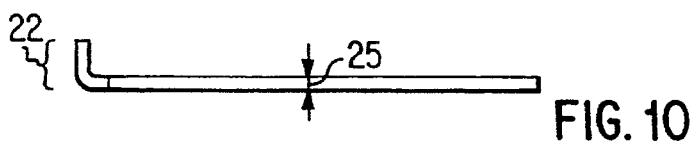
FIG. 10 is an elevational view of the lower narrow side representing the length of the current tapping vane of FIG. 8 with the upper, bent end region.
Figure 11:
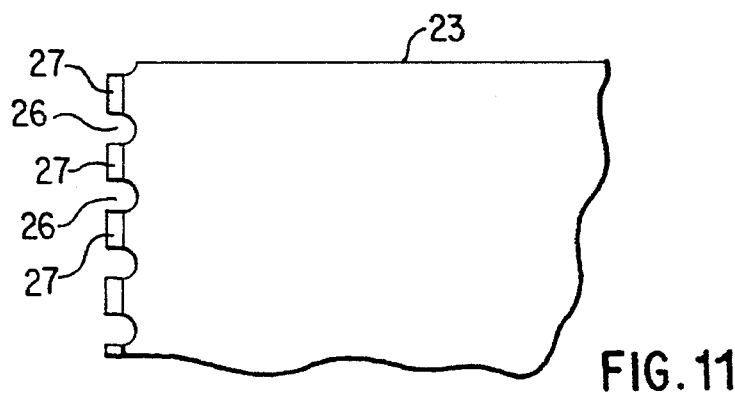
FIG. 11 is a plan view onto the flat side of the current tapping vane of FIG. 10.
Figure 12:
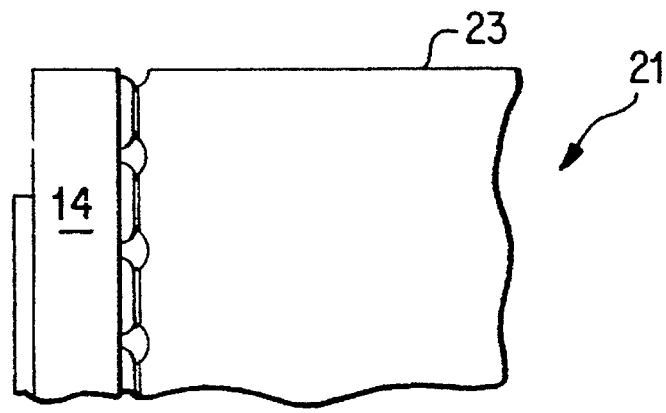
FIG. 12 is a partial view of a connecting strap with two welded-on thick current tapping vanes perpendicular to their flat side.
Figure 13:
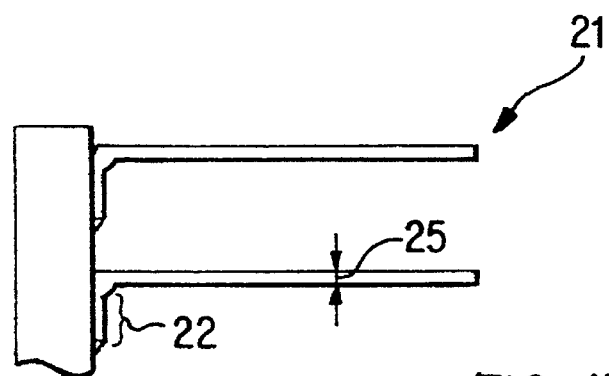
FIG. 13 is an elevational view of the arrangement of FIG. 12, onto the upper narrow sides, representing the length of the current tapping vanes.
Figure 14:
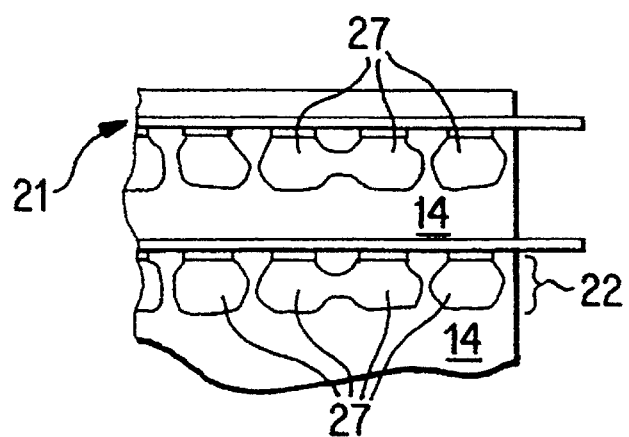
FIG. 14 is an elevational view of the arrangement of FIG. 12, onto the right-hand narrow sides, representing the width of the current tapping vanes.

FIGS. 8 to 11 show a plurality of elevations of a further battery current tapping vane 21 which is likewise provided for the end-side electrical resistance welding with a connecting strap 14 (FIG. 12). This embodiment is particularly suitable for thick current tapping vanes 21 with a wall thickness 25 of between 0.5 mm and 2.0 mm. The current tapping vane 21 has an end region 22 which is to be welded and which is bent over transversely to the current tapping vane 21. The bent end region 22 is provided with tongues 27 which are formed with solid walls and which are provided, at least in the bent end region 22, on both sides with interstices 26. The interstices 26 extend beyond the bent end region 22 exhibiting a depth between 2.5 mm and 5 mm, preferably 4 mm, and are configured to be open towards the upper narrow side of the current tapping vane 21. The tongues 27 are approximately rectangular, and the bases of the interstices 26 have a rounded shape. The width of an interstice 26 corresponds to two to six times the wall thickness 25 of the current tapping vane 21; the width 24 of a tongue 27 corresponds to one to two times the width 28 of an interstice 26. A plurality of tongues 27 are disposed in a uniformly divided row of tongues in a favorable manner, which lie at the end sides and are set back in relation to the lateral margin 23 of the bent end region 22 by at least 0.5 times to a factor of one times the width 28 of the interstices 26.

A novel process for the production of a current tapping vane 21 shown in FIGS. 10 and 11 is now described. A sheet metal strip is inserted into a punching tool in a defined position and the current tapping vane 21 is punched out from the sheet metal strip in accordance with its extended outline form. It is particularly advantageous in the case of the punching out of the extended outline form also to punch out at the same time the interstices 26 to be disposed in the upper end region 22. The interstices are so apportioned that the two outer tongues 27 of a row of tongues exhibit a spacing from the lateral margins 23 of the current tapping vane 21; this spacing corresponds at least to one half of the width 28 of an interstice 26, so that in the subsequent welding on of the connecting strap 14 the melt does not flow away beyond the margin of the connecting strap 14 and make subsequent working necessary. After the punching out of the tongues 27 spaced by the interstices 26, the upper end region 22 is bent over transversely to the current tapping vane 21 by approximately 90° such that the depth of the bent over end region 22 is smaller than the corresponding depth of the interstices 26.

To weld the current tapping vane 21 to the connecting strap 14, all tongues 27 are uniformly pressed onto the connecting strap 14. When the welding current has been switched on, there are then in these regions current concentrations and thus locations of greatest heat development. In the melting of the basic materials, the melt mainly passes out into the interstices 26, but a portion also passes out in front of and behind the tongues 27. Furthermore, the wall thickness 25 of the current tapping vane 21 decreases in the bent end region 22, and the tongues 27 extend on the connecting strap 14.

Figure 15:
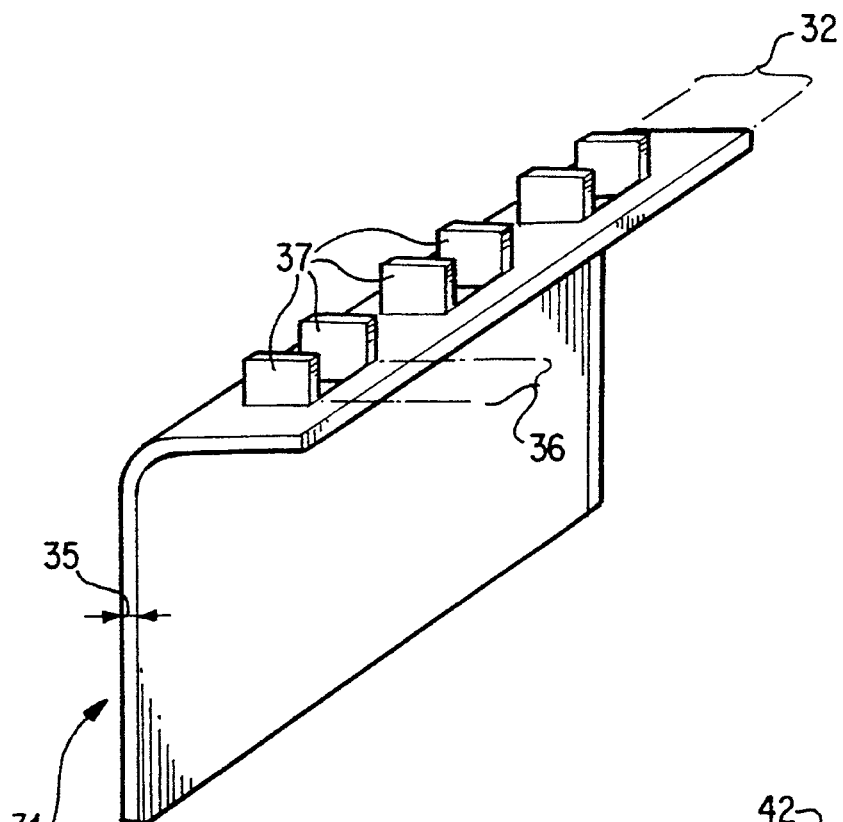
FIG. 15 is a perspective view onto the flat side of the bent end region of a current tapping vane with tab rims of rectangular outline which are disposed to form a row of tabs.
Figure 16:
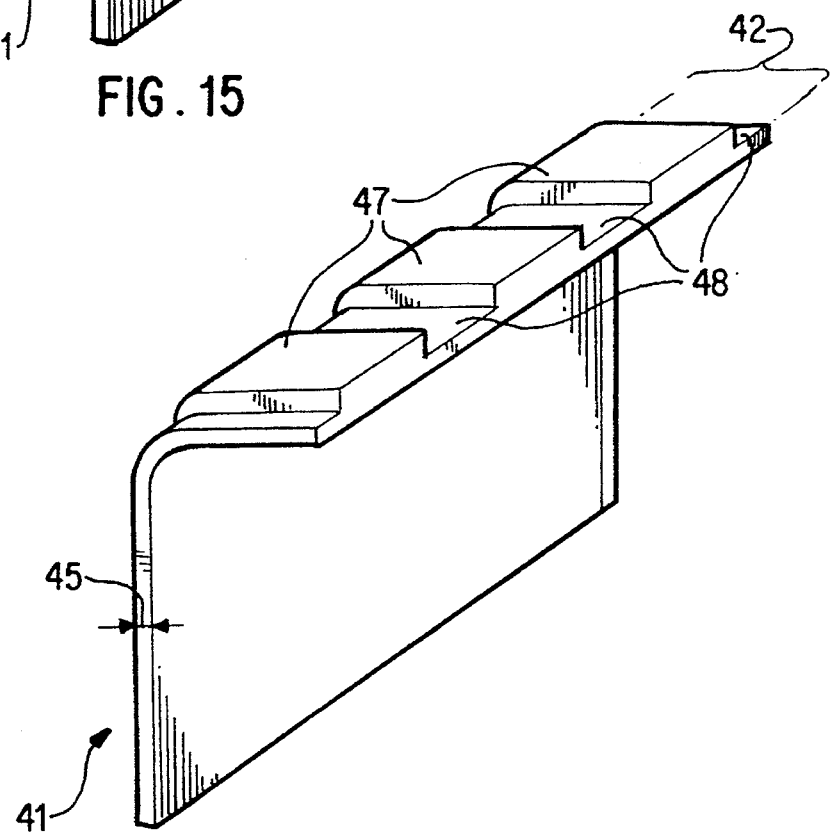
FIG. 16 is a perspective view onto the flat side of the bent end region of a current tapping vane provided with reduced-thickness portions.

Two further embodiments, which differ from the above described embodiments essentially only in the configuration of the weld burls, are shown in FIGS. 15 and 16. In order to avoid unnecessary repetitions, accordingly only their configuration with respect to the weld burls will be entered into in detail.

In the case of the embodiment of FIG. 15, the bent end region 32 has perforations of a rectangular basic shape. The sheet metal tabs 37 punched out from the perforations are aligned parallel to the lateral margins 33 of the current tapping vane 31 and project at an angle of preferably 90° in an upward direction from the flat side 39, to be welded on, of the bent end region 32.

In the embodiment of FIG. 16, the bent end region 42 has reduced thickness portions 46, the depth 44 of which is greater than the amount of settlement in the course of welding on. Thus, the bent end region 42 is provided with tongue-type material elevations 47 which are spaced from one another by the reduced thickness portions 46, and are aligned in their extent parallel to the lateral margins 43 of the current tapping vane 41.

A feature common to all the embodiments of the present invention is that the strength of the weld is increased by the connecting strap by over 10%, and in some cases at the lateral margins by more than 40%. In other cases, the welding of the individual bent end regions to the connecting strap may even take place in common.

As a result of the application of the punched tab rims 6, waste is reduced because point zones required for the electrical resistance welding are formed over the width of the current tapping vanes 1, 31, which are not already deformed back prior to the energization of the welding current. In the destructive testing, the zones are recognizable by the respective tearing away of the material of the current tapping vanes 1, 31 around each individual simultaneously welded tab rim 6, in which instance the alterations to the structure exist in a ring around each tab rim 6.

In a situation of the welding on of the tongue-type weld burls such as tongues 27 (FIGS. 8–11) and material elevations 47 (FIG. 16), a more uniform pressure distribution prevails over the entire length of the weld seam. As a result of the interstices 26 and reduced thickness portions 46 respectively, individual material fluctuations can be better compensated in the welding zone. During welding, the melt passes out not only forwards and rearwards, but also into the interstices 26 or reduced thickness portions 46, and the material of the tongues 27 or tongue-type material elevations 47 can also be deformed in the direction of the interstices 26 or reduced thickness portions 46, resulting in good welding. Destructive tests demonstrate that convincing results are also obtained thereby.

Furthermore, it has proved to be particularly advantageous that, by way of the current tapping vane according to the invention, cells with a smaller division of the electrode plates can be constructed. Furthermore, the waste figures fall, and fewer quality assurance measures need to be taken, involving savings in time and cost of production.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A current tapping vane of a battery for end-side electrical resistance welding to a connecting strap, comprising an end region of the current tapping vane to be welded configured with a transverse bent end region having a flat face and a plurality of weld regions provided across the bent end region to contact the connecting strap preliminary to welding, wherein the current tapping vane is provided, at least in the bent end region, on sides of the weld regions, with spaces therebetween defining reduced thickness portions having a depth greater than a predetermined amount of settlement of a portion of the welding region contacting the connecting region occurring during welding on such that, after welding, a full surface of the flat side rests against the connecting strap to establish electrical conductivity wherein the weld burls are tongues spaced from one another by interstices, extending beyond an angling off portion of the bent end region.

2. A current tapping vane of a battery for end-side electrical resistance welding to a connecting strap, comprising an end region of the current tapping vane to be welded configured with a transverse bent end region and a plurality of weld regions provided across the bent end region, wherein the weld regions are material archings having sides which project transversely from the bent end region of the current tapping vane and merge with a radius of curvature corresponding to no greater than twice a wall thickness of the current tapping vane into the current tapping vane to define spaces between the weld regions having a depth greater than a predetermined amount of settlement of the weld regions, the weld regions having a flat side configured to contact the connecting strap preliminary to welding and to permit the vane to be individually welded to the connecting strap such that after welding a full surface of the flat side rests against the connecting strap to establish electrical conductivity wherein the material arching is a perforation with a border projecting transversely from a flat side of the bent end region which is to be welded, the border has a plurality of sheet metal tabs combined to form a tab rim, and the sheet metal tabs of a tab rim have a differing longitudinal extent over the bent end region and are distributed irregularly over a periphery of the tab rim, with tips of the sheet metal tabs being predominantly sharp-edged, and gaps of differing widths are disposed between adjacent sheet metal tabs.

3. A current tapping vane of a battery for end-side electrical resistance welding to a connecting strap, comprising an end region of the current tapping vane to be welded configured with a transverse bent end region and a plurality of weld region provided across the bent end region, wherein the weld regions are material archings having sides which project transversely from the bent end region of the current tapping vane and merge with a radius of curvature corresponding to no greater than twice a wall thickness of the current tapping vane into the current tapping vane to define spaces between the weld regions having a depth greater than a predetermined amount of settlement of the weld regions, the weld regions having a flat side configured to contact the connecting strap preliminary to welding and to permit the vane to be individually welded to the connecting strap such that after welding a full surface of the flat side rests against the connecting strap to establish electrical conductivity, wherein a plurality of mutually spaced material archings is disposed in a row, and an internal diameter of the material archings increases towards ends of a row.

4. A current tapping vane of a battery for end-side electrical resistance welding to a connecting strap, comprising an end region of the current tapping vane to be welded configured with a transverse bent end region having a flat face and a plurality of weld regions provided across the bent end region to contact the connecting strap preliminary to welding, wherein the current tapping vane is provided, at least in the bent end region, on sides of the weld regions, with spaces therebetween defining reduced thickness portions having a depth greater than a predetermined amount of settlement of a portion of the welding region contacting the connecting region occurring during welding on such that, after welding, a full surface of the flat side rests against the connecting strap to establish electrical conductivity wherein the weld burls are tongues spaced from one another by interstices, wherein the width of an interstice is between about two to six times the wall thickness of the current tapping vane, and the width of a tongue is between about one to two times the width of an interstice.

5. A current tapping vane of a battery for end-side electrical resistance welding to a connecting strap, comprising an end region of the current tapping vane to be welded configured with a transverse bent end region having a flat face and a plurality of weld regions provided across the bent end region to contact the connecting strap preliminary to welding, wherein the current tapping vane is provided, at least in the bent end region, on sides of the weld regions, with spaces therebetween defining reduced thickness portions having a depth greater than a predetermined amount of settlement of a portion of the welding region contacting the connecting region occurring during welding on such that, after welding, a full surface of the flat side rests against the connecting strap to establish electrical conductivity wherein the weld burls are tongues spaced from one another by interstices, wherein a plurality of tongues are in a uniformly divided row, in which tongues lying at end sides are set back in relation to a lateral margin of the current tapping vane by at least one-half times to one times the width of the interstices.

6. The current tapping vane according to claim 1, wherein the bent end region has a depth between about 2.5 mm and 5 mm.

7. The current tapping vane according to claim 6, wherein the bent end region has a depth of 4 mm.

8. The current tapping vane according to claim 2, wherein the bent end region has a depth between about 2.5 mm and 5 mm.

9. The current tapping vane according to claim 8, wherein the bent end region has a depth of 4 mm.

10. A process for producing of a current tapping vane of a battery for an end-side electrical resistance welding to a connecting strap, comprising the steps of
    (a) bending transversely an end region of the current tapping vane to be welded to a remainder of the current tapping vane by inserting a sheet metal strip into a bending tool in a defined position;
    (b) punching out the current tapping vane from the sheet metal strip in accordance with an extended outline form thereof and providing weld burls at the end region, for electrical resistance welding to a connecting strap by penetrating the current tapping vane; and
    (c) fitting the weld burls into the end region by penetrating the current tapping vane.

11. A process for producing of a current tapping vane of a battery for an end-side electrical resistance welding to a connecting strap, comprising the steps of
    (a) bending transversely an end region of the current tapping vane to be welded to a remainder of the current tapping vane by inserting a sheet metal strip into a bending tool in a defined position;
    (b) punching out the current tapping vane from the sheet metal strip in accordance with an extended outline form thereof and providing weld burls projecting from the end region, for electrical resistance welding to a connecting strap by penetrating the current tapping vane; and
    (c) punching a row of interstices free from the lateral margin of the current tapping vane and exposing spaced tongues.

* * * * *